United States Patent [19]

Germer

[11] 3,781,947
[45] Jan. 1, 1974

[54] COUPLING APPARATUS FOR CONTAINERS

[76] Inventor: John A. Germer, New Galena Rd., R.D. No. 1, Doylestown, Pa. 18901

[22] Filed: Feb. 9, 1972

[21] Appl. No.: 224,864

[52] U.S. Cl. ......... 24/81 E, 248/361 R, 105/366 R, 220/1.5
[51] Int. Cl. ............................................ A44b 21/00
[58] Field of Search ................... 105/366 E, 366 D, 105/366 R, 366 B; 220/23.4, 1.5; 292/256.75; 248/361 R, 119 R; 24/279, 132 WL, 132 LS; 287/89, 96, 23, 56, 189.36 F, 88, 52.05; 85/32 R, 50 R; 151/37, 19 R, 15; 285/365, 366, 367

[56] References Cited
UNITED STATES PATENTS

| | | | |
|---|---|---|---|
| 3,015,407 | 1/1962 | Fesmire et al. | 220/1.5 |
| 3,480,248 | 11/1969 | Lucchino et al. | 248/361 |
| 2,752,187 | 6/1956 | Gordon | 292/256.75 |
| 3,181,901 | 5/1965 | Watts | 24/279 |
| 3,365,229 | 1/1968 | Hitch et al. | 220/23.4 |
| 2,487,989 | 11/1949 | Shevburne | 287/88 |
| 2,766,079 | 10/1956 | Browne | 287/88 |
| 3,238,581 | 3/1966 | Sawyer | 85/32 R |

*Primary Examiner*—Jordan Franklin
*Assistant Examiner*—Conrad L. Berman
*Attorney*—Thomas I. Davenport et al.

[57] ABSTRACT

Coupling mechanism for joining a pair of adjacent containers together. The mechanism includes a pair of corner fittings, one being mounted in one container and the other in an opposite corner of an adjacent container. A threaded element having a spherical end is retractable from the interior of one corner fitting to engage a keeper element on the other corner fitting. The opposed corner fittings include complemental key portions for precision alignment and, are effective to transmit vertical and lateral forces between the containers when fastened together.

2 Claims, 9 Drawing Figures

PATENTED JAN 1 1974 3,781,947

COUPLING APPARATUS FOR CONTAINERS

The transport revolution which has been spreading throughout the industrialized world has been spearheaded by the cargo container which is a simple box with doors at one side. Operators in order to integrate road, rail and sea transport have initially confined themselves to building containers of standard sizes, mostly rather large. The result has been a radical reduction in transit costs.

A need has been found however for coupling containers of smaller sizes or modules which can be assembled in arrays having an overall size equal to that of the standard sizes referred to above. This has been found necessary because various overseas ports do not have handling equipment suitable for the larger standard sized containers which must then with difficulty be transported over marginal terrain. In addition the wide variety of cargo shipped such as food, electronic gear and spare parts requires flexibility in container size.

Accordingly it is the principal object of the present invention to provide improved coupling mechanism for joining together containers of various sizes into array which avoids one or more of the disadvantages of the prior art.

It is another important object of this invention to provide coupling mechanism to enable containers of small size to be assembled in arrays of larger size and upon shipment to a field location to thereafter be separated by hand into smaller units for subsequently field transport.

It is another important object of this invention to provide improved coupling mechanisms for containers which enable the same to be readily assembled together and lifted or stacked in relation to other containers.

In accordance with the invention a coupling mechanism is provided for securing together adjacent aligned containers, each having corner fittings and movable so that the corner fitting of one container is in opposed relationship to a complemental corner fitting of the other container. One fitting of the pair of opposed fittings is provided with rod means which in the uncoupled state of the containers is completely retracted within the said one fitting. The rod means may be pivotally extended from the said one fitting to engage keeper means provided on the complemental corner fitting of the other container. Nut means cooperable with the rod means and the keeper means are provided to draw the container together. The opposed corner fittings are, in addition, provided with key means to withstand vertical and lateral shear stresses when the containers are lifted.

The above and further objects and various features and advantages of the invention will be apparent from the following description of an exemplary embodiment, reference being made to the accompanying drawings, wherein.

Figure 1:
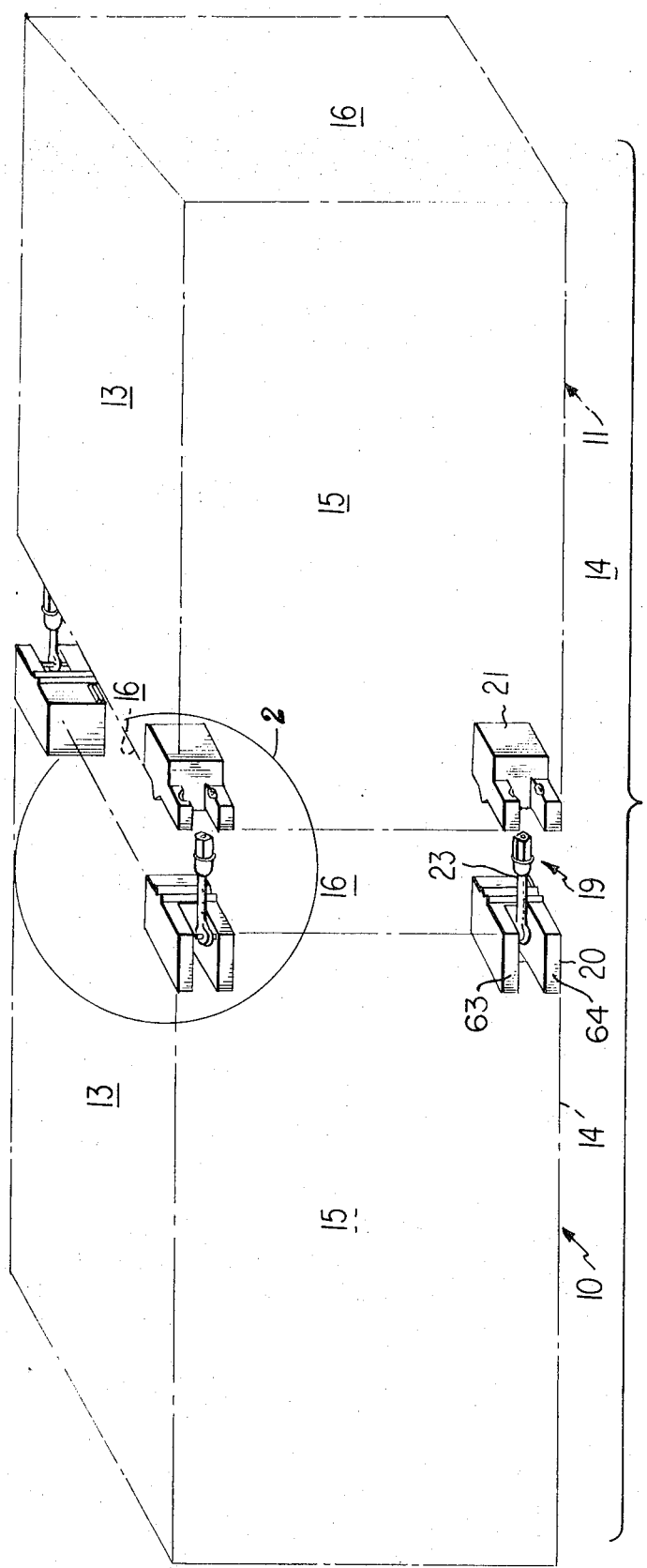
FIG. 1 is a three quarter elevational view showing a pair of adjacently aligned containers arranged to be drawn together and coupled by the coupling apparatus of the present invention.

Referring first to FIG. 1 it is seen that a pair of containers 10 and 11 are provided, each in the form of cargo body of stressed skin construction whose top 13, bottom 14, side 15, and end panels 16 respectively are secured to the coupling apparatus 19 of the present invention.

Figure 4:
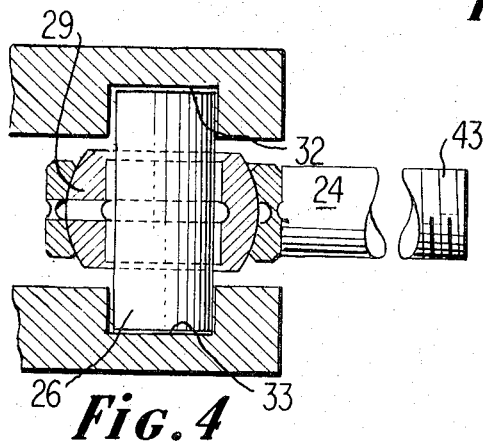
FIG. 4 is a sectional view taken along the lines 4—4 of FIG. 3 illustrating the manner of mounting the rod means in a corner fitting of one of the adjacently aligned containers.
Figure 5:
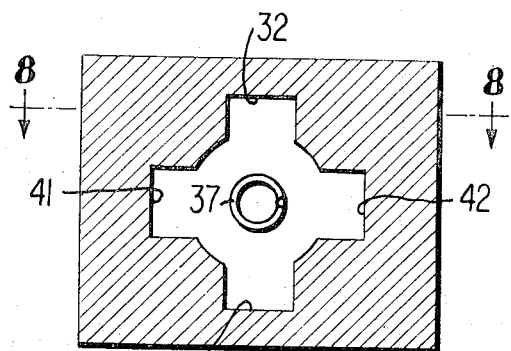
FIG. 5 is a sectional view taken along the lines 5—5 of FIG. 3 illustrating the slot portion of receiving the rod means when retracted.
Figure 6:
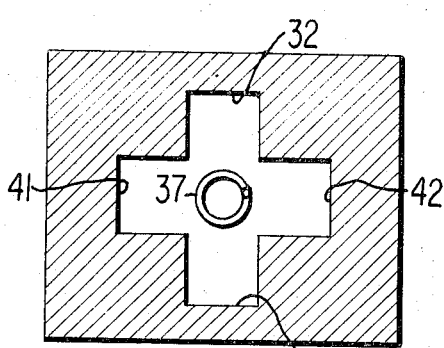
FIG. 6 is a view taken along the lines 6—6 of FIG. 3.

The coupling apparatus 19 is shown as comprising a corner fitting 20 in container 10 and a complemental corner fitting 21 in container 11 which is aligned with and opposite to fitting 20. Corner fitting 20 has mounted therein threaded rod means 23 which includes a rod member 24 having an eye end portion 25. A stub shaft 26 is mounted in the eye end portion at right angles to the axis of shaft 24 by means of spherical bearing 29, FIG. 4, The corner fitting includes a hollow track portion 31 which includes upper and lower grooves 32, 33 for maintaining the shaft rod means captive to the corner fitting 20. The track grooves 32, 33 are curved forwardly at their outer ends as at 35 to provide a recess for the opposite ends of the stub shaft 26 when the threaded rod means 23 are withdrawn from the recess and is pivoted in a direction to be coupled with the corner fitting of the next adjacent container 11. In the uncoupled state of the containers, spring means 37 fastened at its outboard end to the stub shaft 26 at one end and at its other end as at 39 to the inboard end of track opening 31 operate to automatically retract the captive end of the spherical rod means completely within the hollow fitting. With reference to FIG. 5 it is noted that the hollow fitting 20 includes grooves 41, 42 which accommodate inward lateral retractive movement of the eye portion 25 of the threaded rod 23. The spring 37 exerts a force sufficient only to retract the threaded rod means 23 within the opening 31, and this force is easily overcome by a hand force exerted by an operator.

Figure 3:
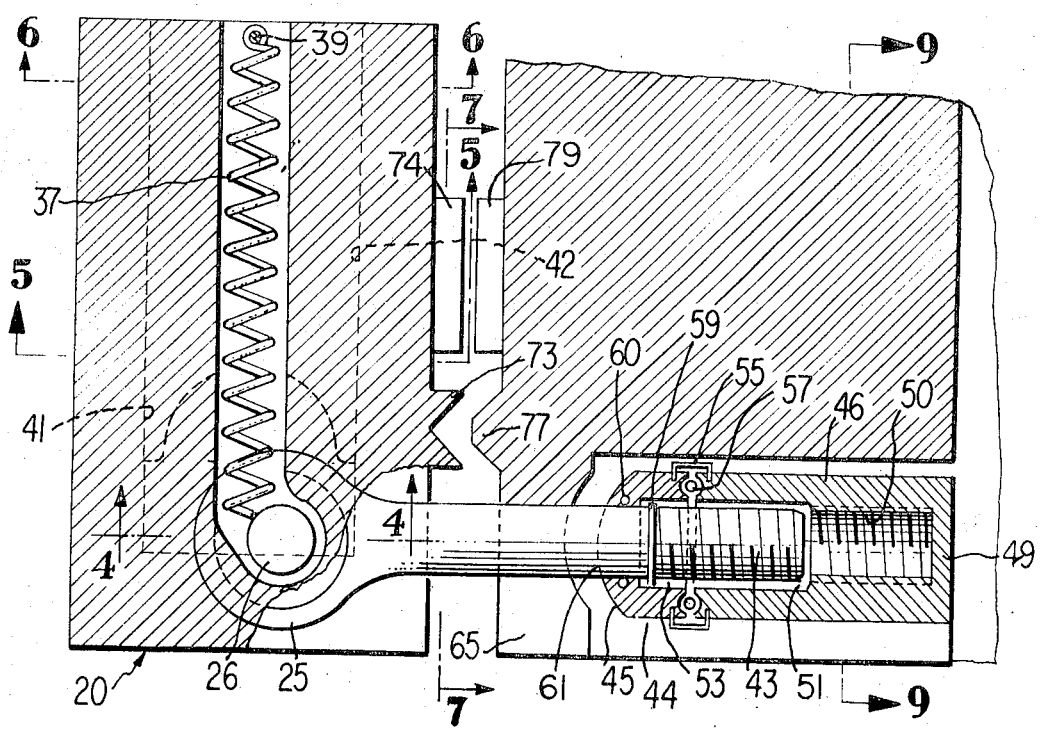
FIG. 3 is a sectional view taken along the lines 3—3 of FIG. 2 illustrating the threaded rod means in its locking position prior to turning down the nut associated with the rod.
Figure 8:
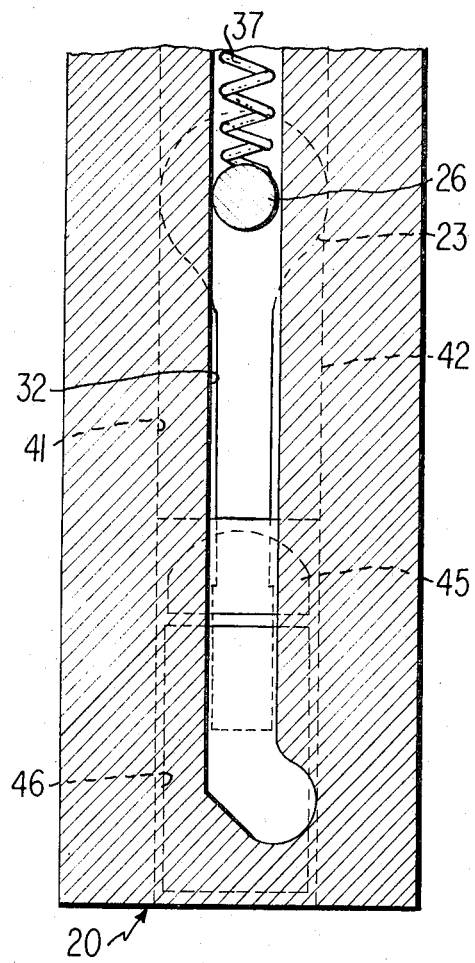
FIG. 8 is a view taken along the lines 8—8 of FIG. 5 showing the threaded rod member with its spherical washer and nut completely retracted within the corner fitting of one of the containers.
Figure 9:
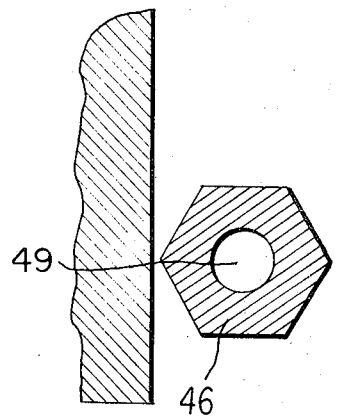
FIG. 9 is a sectional view taken along the lines 9—9 of FIG. 3.

Referring to FIGS. 3 and 8 it is seen that the end of the pivotable rod 24 opposite from stub shaft 26 includes a threaded portion 43 at its outer end. This outer end has a spherical washer nut assembly 44 including a spherical washer 45 and a nut 46 which has a closed end wall as at 49. The nut includes an internally threaded portion as at 50 and a bore portion 51 of larger diameter axially contiguous with its threaded portion. The spherical washer 45 also has a bore portion 53 of the same diameter as the bore portion 51 in the nut 46. A circular U-shaped retainer ring 55 with a suitable washer 57 enables rotation of the nut 46 relative to the spherical washer 45 while preventing contaminants from reaching the threaded portion 43 of the rod. The contaminants arise from field use of the containers in which the containers are at various times subject to snow, ice, mud, etc. A snap ring 59 received suitably secured to the rod adjacent the thread portion 43 of the rod 24 prevents the spherical washer-nut assembly 44 from cornering off the rod. The spherical washer also includes a seal 60 between the external surface of the shaft 24 and the spherical washer.

Figure 2:
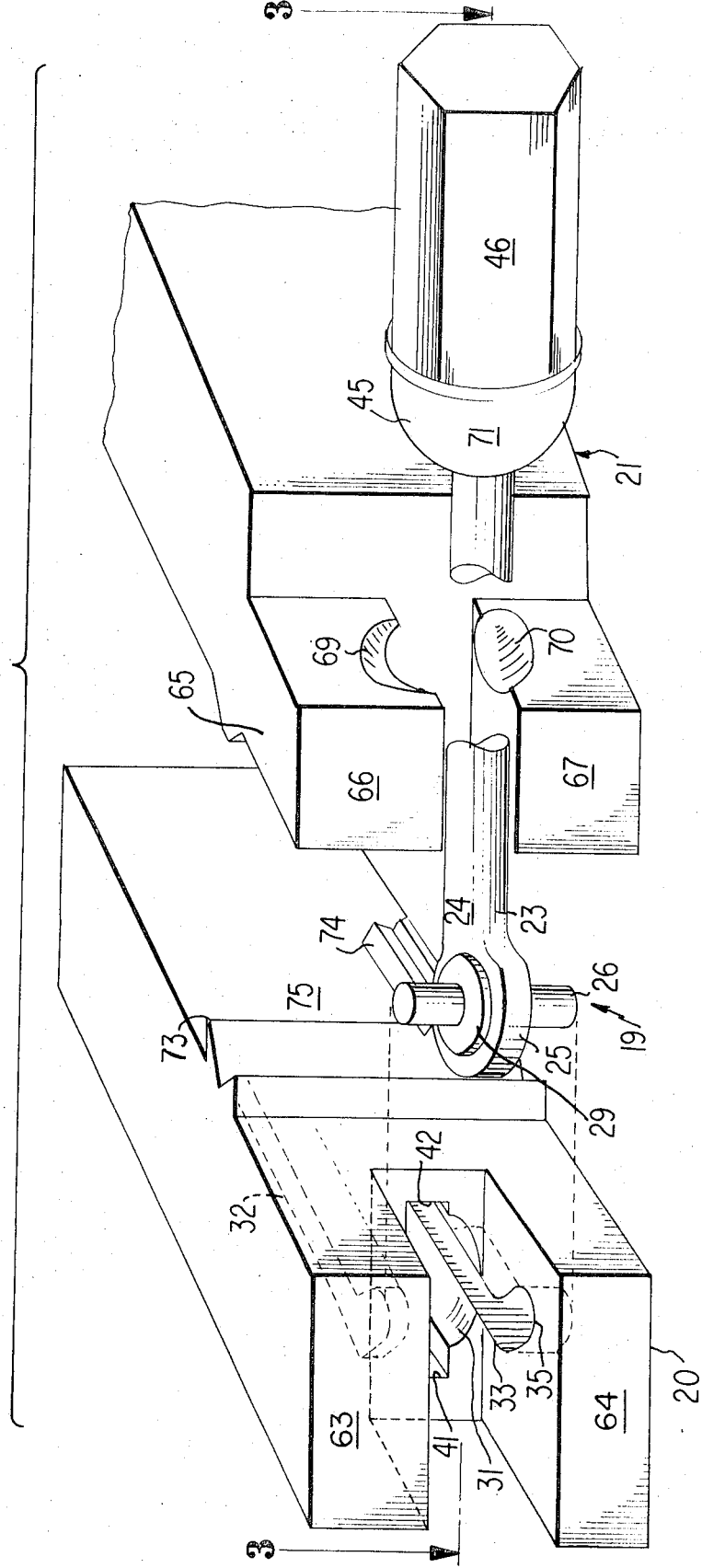
FIG. 2 is a greatly enlarged view of the encircled portion of FIG. 1 thereof, and partially exploded.

As best seen in FIGS. 1 and 2 the leftmost corner fitting 20 includes upper and lower laterally projecting arm portions 63, 64 into which the aforementioned upper lower slot 32, 33 are formed in order to enable tracked lateral movement of the threaded rod assembly 23. The latter assembly may be rotated as indicated in FIGS. 2 and 3 to engage keeper means 65 comprising upper and lower laterally extending arm portions 66 and 67 which include spherical depressions as at 69, 70 respectively. The spherical washer 45 includes a spherical surface 71 which is complemental to the aforementioned spherical depressions 69, 70 and coacts therewith when the rod assembly is pivoted about stub shaft 26 to its locking position, FIG. 3, and nut assembly 45 is suitably tightened.

Figure 7:
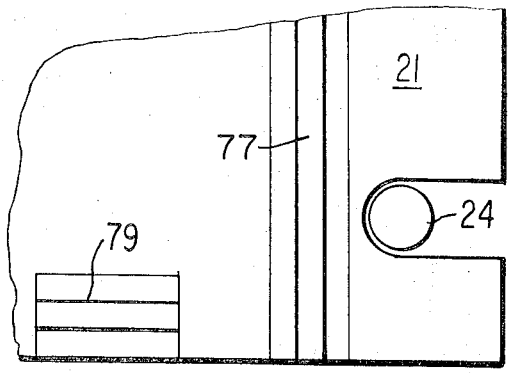
FIG. 7 is a view taken along the lines 7—7 of FIG. 3 illustrating the keeper forming a portion of an adjacent corner fitting.

As best seen in FIG. 2 corner lift coupling fitting 20 includes a vertically disposed key or tooth portions 73 as well as horizontally disposed teeth portions 74 projecting from end faces 75 of the fitting. Complemental corner fitting 21, FIG. 7, also includes a vertically aligned key or tooth portion 77 and a horizontally disposed key element 79 which mesh with the aforementioned alignment keys 73, 74 respectively. With the corner fittings 20, 21 aligned as indicated in FIGS. 1 and 2 and with the threaded rod means retracted from its fitting and rotated so that the spherical washer is past the keeper projections, the nut 46 may be rotated to cause engagement of the spherical washer surface 71 with the spherical depressions 69, 70 of the keeper projections. The rotation of the nut can be accomplished by an unskilled operator with a simple hand tool such as a wrench. The left end of the threaded rod assembly 23 which includes a spherical bearing assembly 29 and the right hand of the threaded rod with its spherical washer cooperates with the aforementioned depressions in the keeper to apply a linear force to pull the containers together. Inasmuch as a spherical ball fitting is employed at one end of the rod and the spherical washer and spherical depressions are engaged at the keeper fitting a high degree of self-alignment between the containers is achieved as the pull-in forces are applied by the nut. This follows because the link or rod is enabled to pivot universally essentially about both of its ends. In addition as the nut is taken up further on the rod the vertical teeth 73 and horizontal teeth 74 projecting from end face 75 of the corner fitting engage complemental teeth 77, 79 of corner fitting 21. Upon mating of the latter teeth of the coupling fittings vertical and lateral positioning of the containers is accomplished to satisfy severe tolerance requirements. The triangular keys or teeth thereafter serve to transmit the vertical and lateral forces between the containers when the coupling mechanism is fully secured and the containers so joined are hoisted or lifted during shipment. Since the keys are external of the corner fittings only the faces of the keys must be cleaned of foreign matter such as dirt, ice, and the like in order to obtain precision fit between the containers.

While there has been described what at present is considered to be the preferred embodiment of this invention, it will be obvious to those skilled in the art that various changes and modifications may be made therein without departing from the invention and it is aimed to cover all such changes as fall within the scope of this invention.

What is claimed is:

1. Coupling apparatus for fixturing the corners of a pair of adjacently arranged containers and locking the same in place relative to one another, comprising in combination one corner fitting defining track means and mounted in one of said containers, a second corner fitting mounted in said other adjacently arranged container, complemental key means disposed on opposed surfaces of said one and said second corner fittings, threaded rod means, a shaft mounted in said one corner fitting, resilient means associated with said shaft means and said rod means for normally retracting said threaded rod means along and within said track means within said one corner fitting, spherical bearing means mounting one end of said threaded rod means to permit universal pivotal movement of said threaded rod means with respect to said one corner fitting, keeper means associated with said second corner fitting, said rod means being pivotally movable into engagement with said keeper means, and nut means associated with said rod means and cooperable with said keeper means for drawing said one and said second corner fittings of said adjacently arranged containers together so that said complemental key means are in mating engagement with one another.

2. Coupling apparatus for fixturing the corners of a pair of adjacently arranged containers and locking the same in place relative to one another, comprising in combination one corner fitting including track means mounted in one of said containers and a second corner fitting mounted in said other adjacently arranged container, complemental key means disposed on opposed surfaces of said one and said second corner fittings, keeper means defining a spherical surface associated with said second corner fitting, nut means including washer means having a spherical surface complemental with said spherical surface of said keeper means for engagement with said nut means, threaded rod means including a threaded end portion and including retainer means for coupling said spherical washer means and said nut means for independent turning movement relative to each other, resilient means for normally maintaining said rod means within said track when said containers are uncoupled, said resilient means permitting said rod to be moved out of said track when said containers are to be coupled together, said nut means and said spherical washer means defining a bore encircling said threaded end portion when said threaded end portion and said nut are in threaded engagement, said nut means completely encircling said threaded end when said threaded rod is in locking engagement with said keeper, means mounting said threaded rod means for universal pivotal movement to said one corner fitting, said rod means being pivotally movable into engagement with said keeper means, and said nut means associated with said rod means and cooperable with said keeper means for drawing said one and said second corner fittings of said adjacently arranged containers together so that said complemental key means are in mating engagement with one another.

* * * * *